(12) United States Patent
Yoshikawa et al.

(10) Patent No.: US 7,715,074 B2
(45) Date of Patent: May 11, 2010

(54) HOLOGRAPHIC RECORDING DEVICE (75) Inventors: Hiroyasu Yoshikawa, Kawasaki (JP);
Kouichi Tezuka, Kawasaki (JP);
Kazushi Uno, Kawasaki (JP); Yasumasa Iwamura, Kawasaki (JP); Yuzuru Yamakage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/194,804

(22) Filed: Aug. 20, 2008

(65) Prior Publication Data
US 2008/0309999 A1    Dec. 18, 2008

Related U.S. Application Data

(63) Continuation of application No. PCT/JP2006/303301, filed on Feb. 23, 2006.

(51) Int. Cl.
*G03H 1/28* (2006.01)
(52) U.S. Cl. .......................................... 359/24; 369/103
(58) Field of Classification Search .................. 359/22, 359/24, 29, 30; 369/103
See application file for complete search history.

(56) References Cited

U.S. PATENT DOCUMENTS

| | | | |
|---|---|---|---|
| 5,949,559 | A | 9/1999 | Kihara et al. |
| 7,130,092 | B1 | 10/2006 | Horimai |
| 7,391,702 | B2 | 6/2008 | Horimai |
| 2006/0176532 | A1* | 8/2006 | Toishi .......................... 359/24 |

FOREIGN PATENT DOCUMENTS

| | | |
|---|---|---|
| EP | 1 551 011 A1 | 7/2005 |
| JP | A 10-20747 | 1/1998 |
| JP | A 11-311937 | 11/1999 |
| JP | A 2000-259070 | 9/2000 |
| JP | A 2005-32309 | 2/2005 |
| JP | A 2005-235312 | 9/2005 |
| WO | WO 2004/034387 A1 | 4/2004 |

* cited by examiner

*Primary Examiner*—Alessandro Amari
(74) *Attorney, Agent, or Firm*—Greer, Burns & Crain, Ltd.

(57) ABSTRACT

A holographic recorder can vary the optical distance between an object lens and a relay lens near the object lens. This arrangement allows defocus-multiplexing utilizing state variations in the laser beam when the beam reaches a storage medium.

4 Claims, 11 Drawing Sheets

HOLOGRAPHIC RECORDING DEVICE

This application is a Continuation of International Application No. PCT/JP2006/303301, filed Feb. 23, 2006.

TECHNICAL FIELD

The present invention relates to a holographic recording device that makes a holographic recording of information with respect to a storage medium.

BACKGROUND ART

In holographic recording, an interference pattern is generated on a storage medium, using an information beam which has two-dimensional page information and a reference beam which is separated from the same beam flux from which the information beam is separated, and the interference pattern is recorded. When reproducing the recorded information, the reference beam used for the recording is applied onto the recorded area in the storage medium, and a reproduction beam which comes from the storage medium is brought to focus on a two-dimensional-page-beam detector to form an image.

Figure 11:
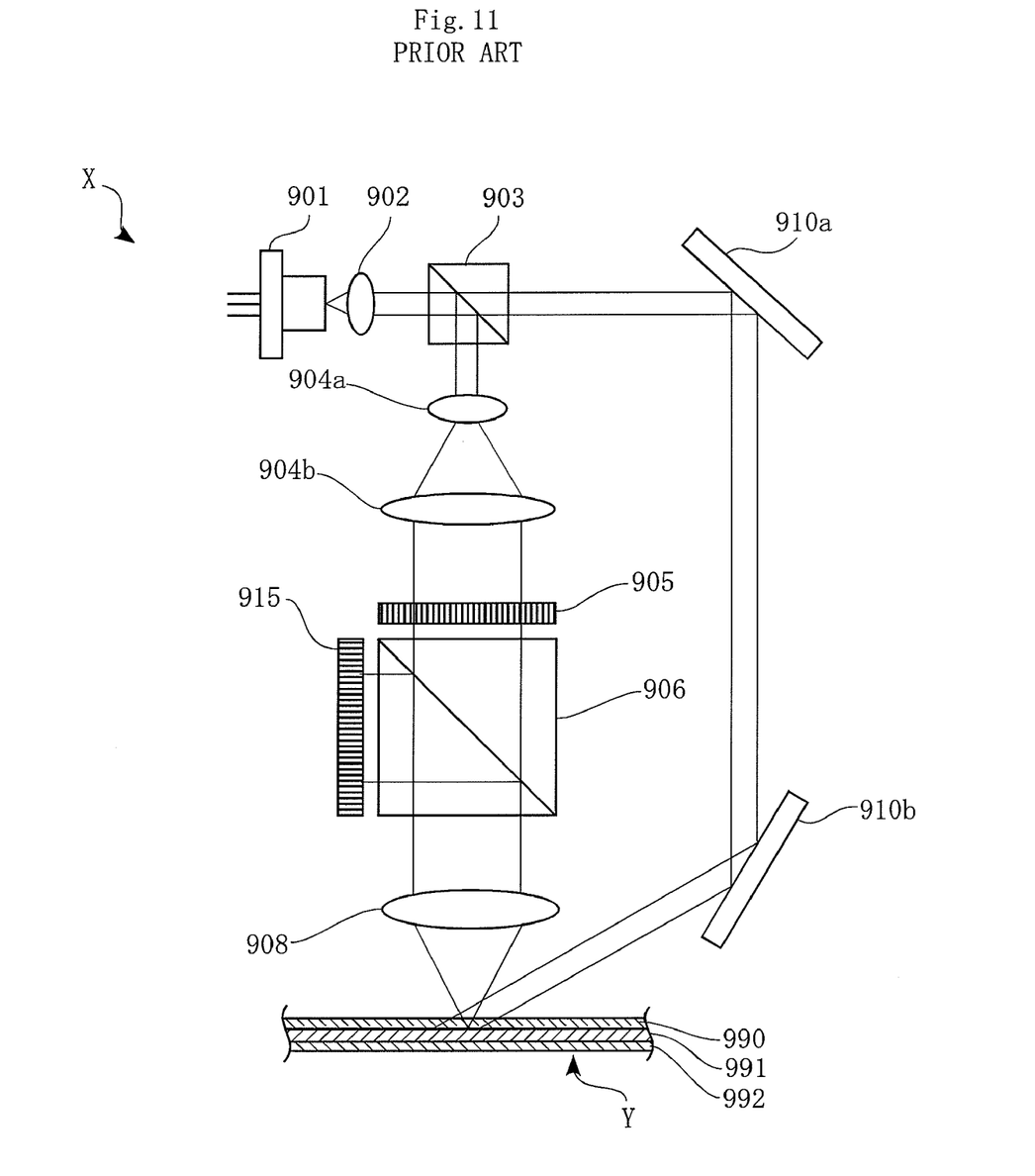
FIG. 11 is a configuration diagram showing a conventional holographic recorder.

Advantages in holographic recording includes multiplex recording, i.e. recording a plurality of pieces of information on the same area in a storage medium. For example, Patent Document 1 discloses a shift-multiplex holographic recorder. FIG. 11 shows a typical configuration of such a holographic recorder.

A holographic recorder X in FIG. 11 is an apparatus designed to record information on a storage medium Y as well as reproduce the recorded information by a shift-multiplex method. The storage medium Y includes a recording layer 991, which is made of a recording material such as photopolymer, sandwiched between a substrate 990 which is made of a glass plate for example, and a reflection layer 992. The storage medium Y is capable of recording interference patterns made by the information beam and the reference beam, in the form of refraction index changes of the recording material. Also, by applying only the reference beam to the recorded interference pattern, optical information which represents the recorded information is extracted.

In the holographic recorder X, a laser beam from a light source 901 is made into a parallel beam by a collimator lens 902, and then introduced to a beam splitter 903. The laser beam is then split by a beam splitter 903 into an information beam which comes out in a downward direction as in FIG. 11, and a reference beam which comes out in a rightward direction in the figure. The information beam is expanded in its beam diameter by combined lenses, i.e. beam expanders 904a, 904b, and then introduced to a spatial light modulator 905. The information beam is modulated by the spatial light modulator 905 into a beam which includes two-dimensional page information. The information beam which has left the spatial light modulator 905 passes through a beam splitter 906 and then through an object lens 908. The information beam is then condensed by the object lens 908 onto a recording layer 991. On the other hand, the reference beam is reflected by reflection mirrors 910a, 910b, and applied to the portion on the recording layer 991 where the information beam is applied.

Information recorded on the recording layer 991 by the information beam and the reference beam as described is reproduced when only the reference beam is applied to the recording layer. Specifically, when the reference beam is applied to the recording layer 991, a reproduction beam is generated which includes the two-dimensional page information. The reproduction beam is turned back by the reflection layer 992 in an upward direction as in FIG. 11, and enters the object lens 908. The reproduction beam, which is made into a parallel beam by the object lens 908, is then turned to the left as in FIG. 11 by the beam splitter 906, and enters a photo detector 915. The photo detector 915 extracts the two-dimensional page information contained in the reproduction beam.

The holographic recorder X uses shift-multiplex method in which multiplex recording of information is performed while making a very fine shift on the recording area. In the shift-multiplex method, accurate application of the reference beam to the storage medium Y is essential in order to make recording as well as reproducing, and for this reason, a complicated system is necessary as a means for controlling the storage medium Y. There is a similar problem in holographic recorders which use angle-multiplex method in which multiplex recording is accomplished by varying an incoming angle of the reference beam. In this case, it is difficult to control a reflection mirror which is used to apply the reference beam.

Patent Document 1: JP-A-2005-235312

DISCLOSURE OF THE INVENTION

Problems to be Solved by the Invention

The present invention has been proposed under the above-described circumstances, and it is therefore an object of the present invention to provide a holographic recorder utilizing a multiplex method which is simple to implement and capable of increasing recording density.

Means for Solving the Problems

A holographic recorder provided by the present invention includes: a light source for outputting coherent light; a beam splitter for splitting the light coming from the light source into at least two beams; a spatial light modulator for modulating one of the beams split by the beam splitter into an information beam containing two-dimensional information; relay lenses for relaying the information beam; and an object lens for allowing the information beam relayed by the relay lenses to travel toward a storage medium. The relay lenses includes a first relay lens which is closer to the spatial light modulator and a second relay lens which is spaced from the first relay lens by a distance and is closer to the object lens. The other of the beams split by the beam splitter is used as a reference beam for which makes an interference with the information beam in the storage medium. With the above arrangement, an optical distance between the second relay lens and the object lens is variable.

Preferably, a focusing portion of the information beam from the first relay lens to the second relay lens passes through an aperture between the first relay lens and the second relay lens.

Preferably, a physical distance between the second relay lens and the object lens is variable.

Preferably, the holographic recorder further includes an optical device which has a predetermined thickness and a variable refraction index, and is disposed between the first relay lens and the second relay lens.

Preferably, the optical device is provided by a liquid crystal device which changes its refraction index in accordance with a voltage applied.

Preferably, the holographic recorder further includes a transparent member which is disposed along a path of the information beam between the first relay lens and the second relay lens, and the transparent member includes sections of different thicknesses movable to come across the information beam path.

Preferably, the transparent member is a generally disc-shaped or a generally doughnut-shaped plate which includes a number of circumferentially arranged segments. Each of the segments has a different thickness from the others, and the transparent member is rotated to place a selected one of the segments on the information beam path.

Other advantages and characteristics of the present invention will become clearer from the following description to be made for embodiments of the present invention.

BEST MODE FOR CARRYING OUT THE INVENTION

Preferred embodiment of the present invention will be described below with reference to the drawings.

Figure 1:
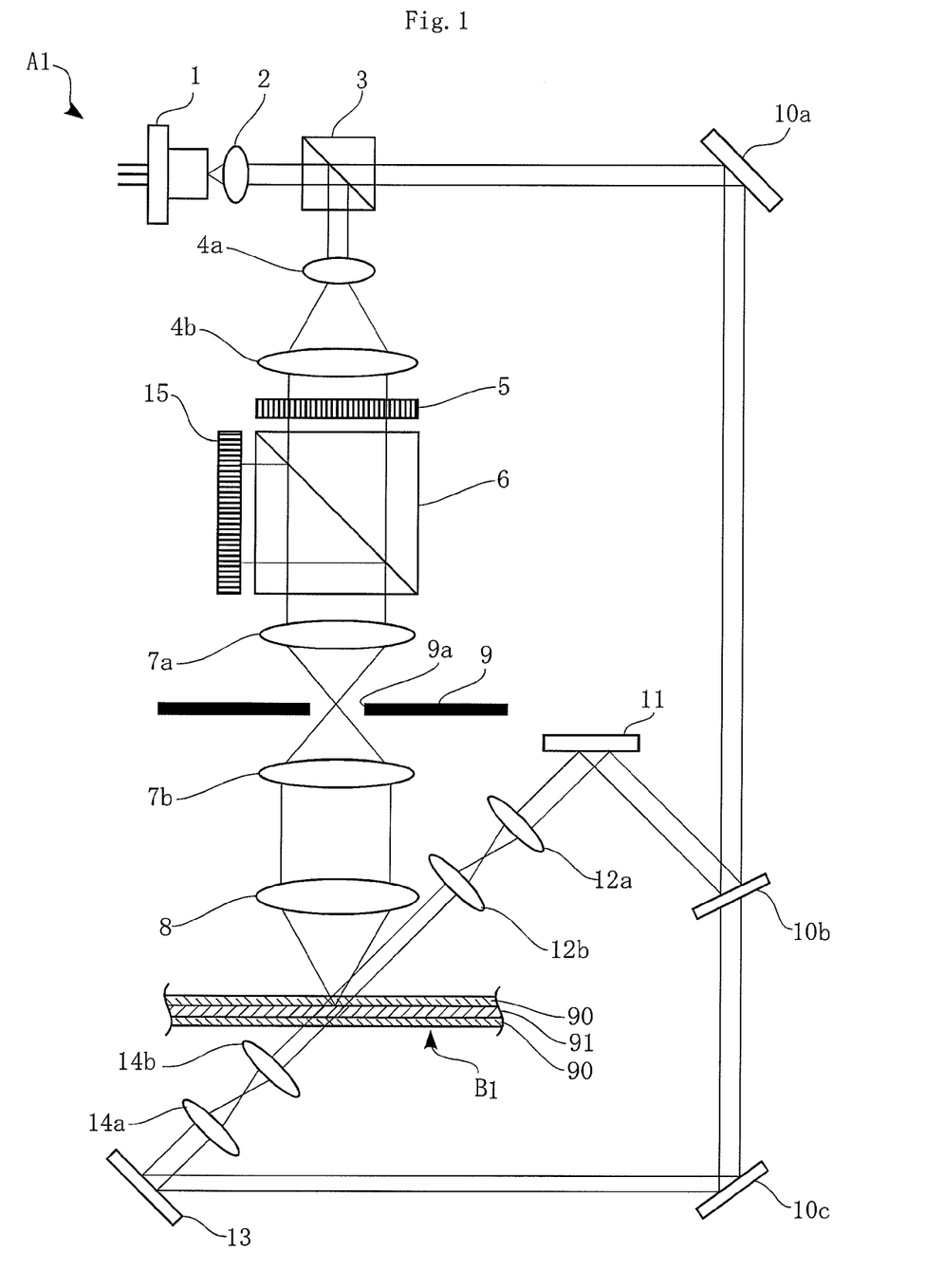
FIG. 1 is a configuration diagram showing a holographic recorder as a first embodiment of the present invention.

FIG. 1 shows a first embodiment of the holographic recorder according to the present invention. A holographic recorder A1 in FIG. 1 performs holographic recording by applying an information beam and a reference beam to a storage medium B1. As shown in FIG. 1, the holographic recorder A1 includes a light source 1, a collimator lens 2, a beam splitter 3, beam expanders 4a, 4b, a spatial light modulator 5, a beam splitter 6, relay lenses 7a, 7b, an object lens 8, a beam blocking plate 9 with an aperture 9a, reflection mirrors 10a, 10b, 10c, a recording-purpose galvanomirror 11, condenser lenses 12a, 12b, a reproduction-purpose galvanomirror 13, condenser lenses 14a, 14b and a photo detector 15. Other constituent elements which are not illustrated include a rotation mechanism for rotating the storage medium B1 as a turning disc, and a carrier mechanism for moving the optical system such as the object lens 8 radially of the storage medium B1, as well as a carrier mechanism for moving the object lens 8 and the storage medium B1 in an up-down direction as in FIG. 1.

The light source 1 is provided by a semiconductor laser beam oscillator for example, and emits a laser beam, that is, coherent light which has a relatively narrow band and a highly interfering nature, at a time of recording as well as reproducing. The collimator lens 2 converts the laser beam from the light source 1 into a parallel beam. The laser beam which comes out of the collimator lens 2 is introduced into the beam splitter 3, and split into an information beam and a reference beam. The information beam, which is a beam reflected by and coming out of the beam splitter 3 in the downward direction as in FIG. 1, enters the beam expanders 4a, 4b. The beam expanders 4a, 4b are provided by combined lenses, and increase the beam diameter of the information beam while allowing the information beam into the spatial light modulator 5. The reference beam, which is a beam passing through and comes out of the beam splitter 3 in the rightward direction as in FIG. 1, is reflected by the reflection mirrors 10a, 10b, and then travels to the recording-purpose galvanomirror 11. It should be noted here that preferably, a polarized plate for example is utilized to make the information beam and the reference beam conjugate with each other.

The spatial light modulator 5, which is provided by a liquid-crystal display device for example, modulates an incoming beam into a beam having a two-dimensional pixel pattern at the time of recording. The pixel pattern which is generated by the spatial light modulator 5 is varied in accordance with the information to be recorded. After leaving the spatial light modulator 5, the information beam passes through the beam splitter 6, the relay lenses 7a, 7b and the object lens 8, and finally hits the hologram storage medium B.

The relay lenses 7a, 7b are disposed on the information beam path in such a way that the distance between the lenses is equal to a sum of their focal distances. Thus, there is a place between the two relay lenses 7a, 7b which represents a shared focal point of the two lenses, where the information beam comes to focus and then enters the relay lens 7b. At this particular place where the information beam comes to focus, is the aperture 9a, or an opening, surrounded by the beam blocking plate 9. The beam blocking plate 9 blocks beam components which have passed the relay lens 7a but has not focused near the focal point, making it possible to prevent unnecessary beams from reaching the relay lens 7b. Thus, the information beam which comes out of the relay lens 7b becomes like a parallel beam, making its entry into the object lens 8 substantially vertically thereto. The distance between the object lens 8 and the recording region of the storage medium B1 should be equal to the focal distance of the object lens 8 since such an arrangement will ensure that the substantially parallel information beam will be focused on the storage medium B1 by the object lens 8.

On the other hand, the reference beam which has reached the recording-purpose galvanomirror 11 is guided by the condenser lenses 12a, 12b and hits the storage medium B1 from an upper right direction as in FIG. 1. The recording-purpose galvanomirror 11 is capable of varying the incoming angle of the reference beam at the time of recording. The recording-purpose galvanomirror 11 and the condenser lenses 12a, 12b are disposed in such a layout that they will ensure the reference beam to cover an area on the storage medium B1 including the area hit by the information beam.

The storage medium B1 includes a recording layer 91 which is provided by a recording material such as a photo polymer, sandwiched by substrates 90 made of glass for example, from above and below as in FIG. 1. The recording layer 91 is capable of recording interference patterns made by the information beam and the reference beam, in the form of refraction index changes. In order to reproduce the information recorded on the storage medium B1, it is necessary to apply the same reference beam which was used at the time of recording. Thus, at the time of reproducing, the reflection mirror 10b is removed in order to allow the reflection mirror 10a to reflect the reference beam to travel to the reflection mirror 10c, and then to the reproduction-purpose galvanomirror 13. The reproduction-purpose galvanomirror 13 is capable of varying the entering angle of the reference beam. The reference beam which was reflected by the reproduction-purpose galvanomirror 13 travels to the condenser lenses 14a, 14b, and to the storage medium B1 from a lower left direction as in FIG. 1. In this process, the entering angle of the reproduction-purpose reference beam with respect to the storage medium B1 is adjusted to be equal to the entering angle of the recording-purpose reference beam with respect to the storage medium B1, by the reproduction-purpose galvanomirror 13.

Upon application of the reference beam, the storage medium B1 gives off a reproduction beam in an upward direction as in FIG. 1. As shown in FIG. 1, the reproduction beam enters the object lens 8, comes out of the object lens 8 as a parallel beam, enters the relay lens 7b, comes out of the relay lens 7b, is narrowed by the aperture 9a, enters the relay lens 7a, and then enters the beam splitter 6 as a parallel beam. The reproduction beam is reflected on the beam splitter 6, thus comes out in the leftward direction as in FIG. 1, and reaches the photo detector 15. The photo detector 15 is provided by a CCD area sensor or a CMOS area sensor, which provides a beam reception signal representing a pixel pattern contained in the reproduction beam. Based on the beam reception signal, information which represents a pixel pattern at the time of recording is reproduced.

In the holographic recorder A1, the distance between the relay lens 7b and the object lens 8 is variable. Note, however, that the distance between the relay lenses 7a and 7b, and the distance between the object lens 8 and the storage medium B1 are not variable. Specifically, it is preferable that the rotation mechanism on which a storage medium B1 is placed is connected with the object lens 8 so as to move integrally with each other in up-and-down directions as in FIG. 1. The rotation mechanism may also be connected with both of the galvanomirrors 11, 13, the condenser lenses 12a, 12b, 14a, 14b, and the reflection mirrors 10b, 10c, so that all of them are movable integrally with each other.

Still another arrangement may be that the relay lenses 7a, 7b and the beam blocking plate 9 are combined with each other movably between the beam splitter 6 and the object lens 8.

Next, the functions of the holographic recorder A1 will be described.

The holographic recorder A1 is capable of making multiplex recording by varying the distance between the relay lens 7b and the object lens 8. Specifically, the holographic recorder A1 is capable of making defocus-multiplex recording in addition to conventional angle-multiplex and shift-multiplex recordings. Hereinafter, description will be made for the defocus-multiplex recording according to the holographic recorder A1 with reference to FIGS. 2 through 6. FIGS. 2 through 6 show the spatial light modulator 5, the beam splitter 6, the relay lenses 7a, 7b, the aperture 9a, the object lens 8, the condenser lenses 12b, 14b, the photo detector 15 and the storage medium B1. Each of the figures shows a travel path of a laser beam from three locations in the spatial light modulator 5. It should be noted here that since the spatial light modulator 5 typically has a slit structure, there will be a plurality of diffracted lights when a laser beam passes through. Although most of these diffracted lights are blocked by the aperture 9a, some pass through the aperture 9a together with the laser beam and travel to the storage medium B1. Note that FIGS. 2 through 6 also show such diffracted lights.

Figure 2:
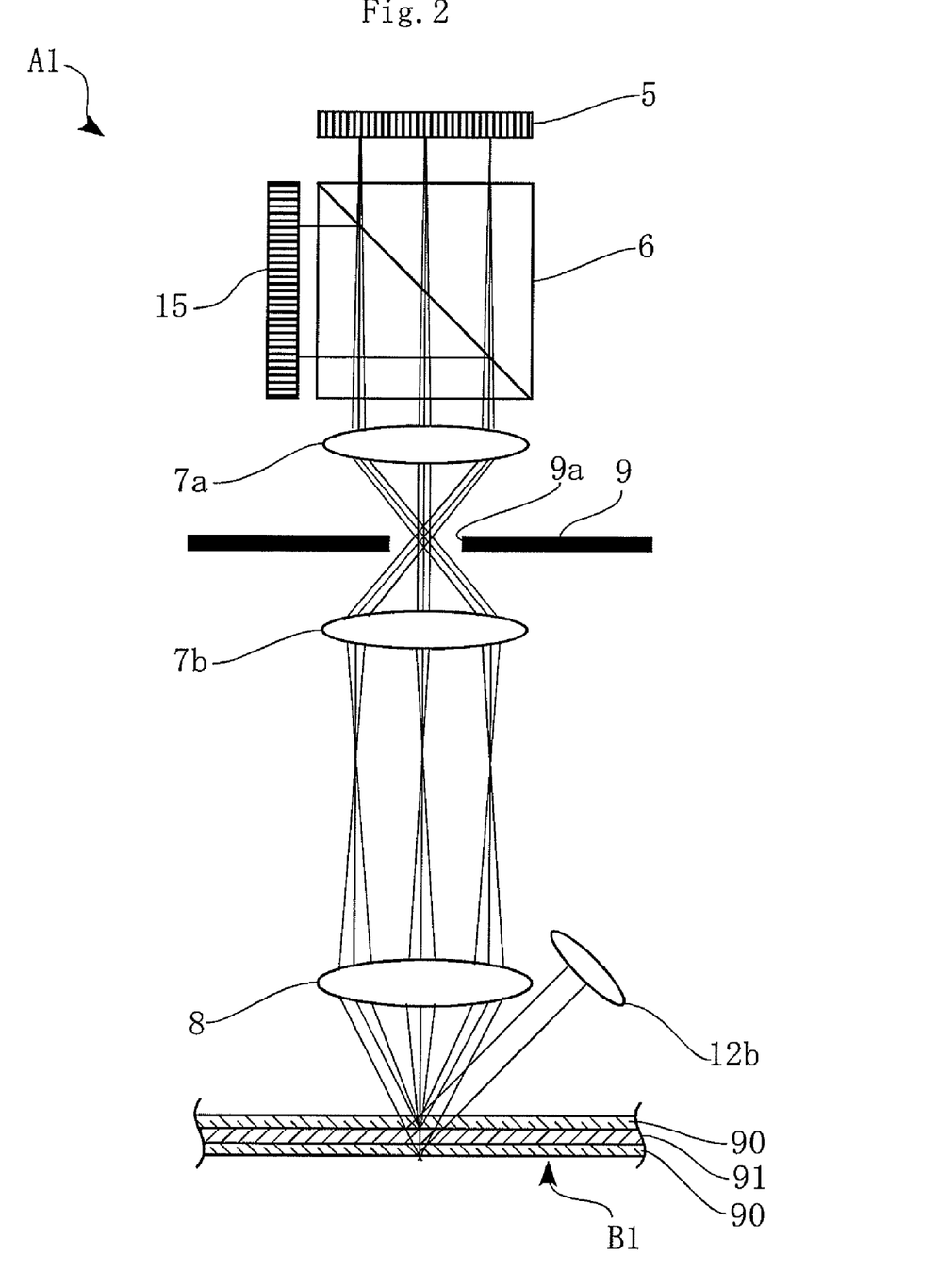
FIG. 2 is an illustrative drawing of multiplex recording by the holographic recorder in FIG. 1.

FIG. 2 shows a case where the distance between the relay lens 7b and the object lens 8 is longer than a sum of the focal distance of the relay lens 7b and the focal distance of the object lens 8 when making recording on the storage medium B1. In this case, as shown in FIG. 2, diffracted lights of the laser beam which come out of the object lens 8 are focused.

Figure 3:
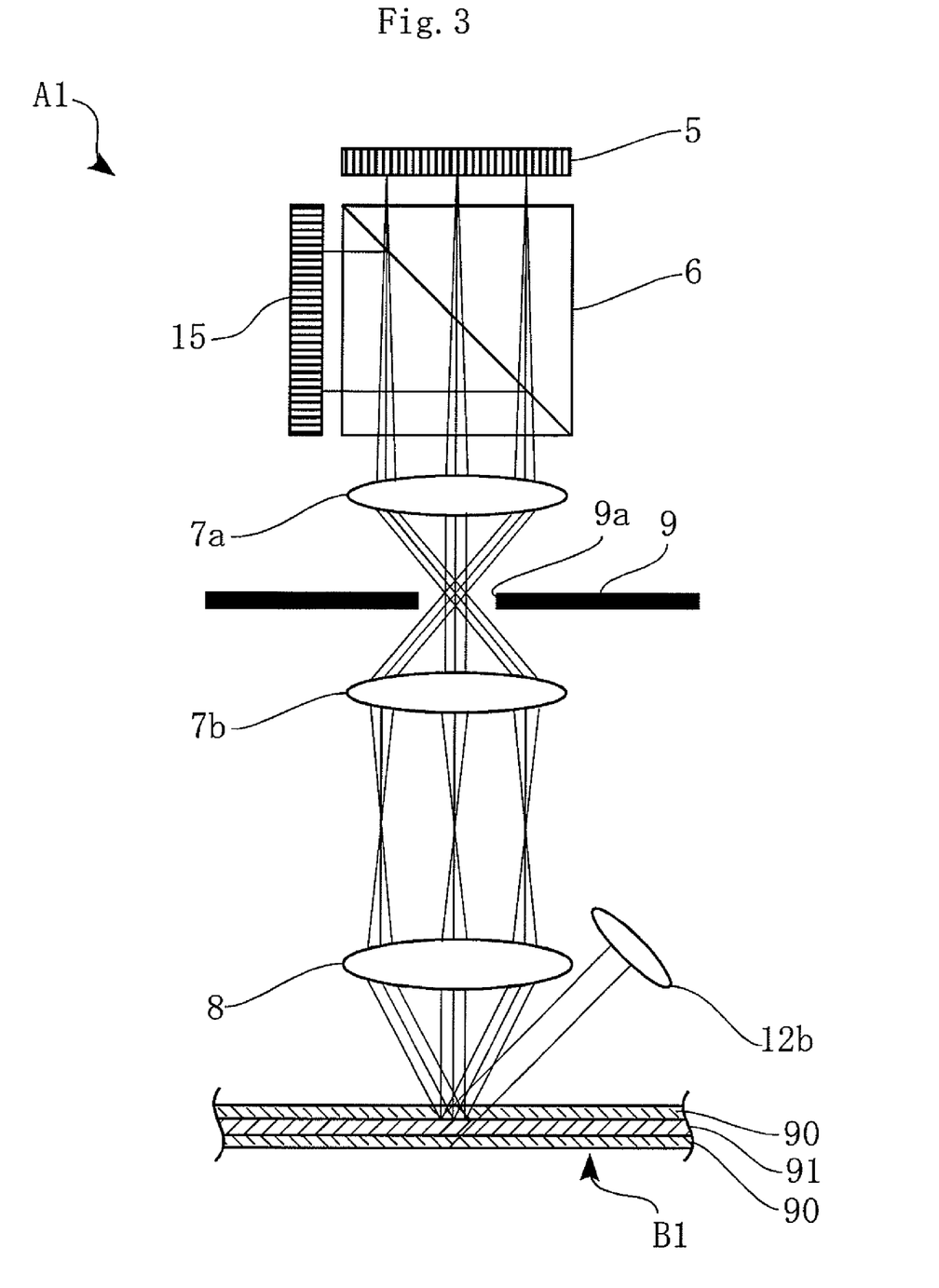
FIG. 3 is an illustrative drawing of multiplex recording by the holographic recorder in FIG. 1.

FIG. 3 shows a case where the distance between the relay lens 7b and the object lens 8 is equal to a sum of the focal distance of the relay lens 7b and the focal distance of the object lens 8 when making recording on the storage medium B1. In this case, as shown in FIG. 3, diffracted lights of the laser beam which come out of the object lens 8 are parallel to the main laser beam.

Figure 4:
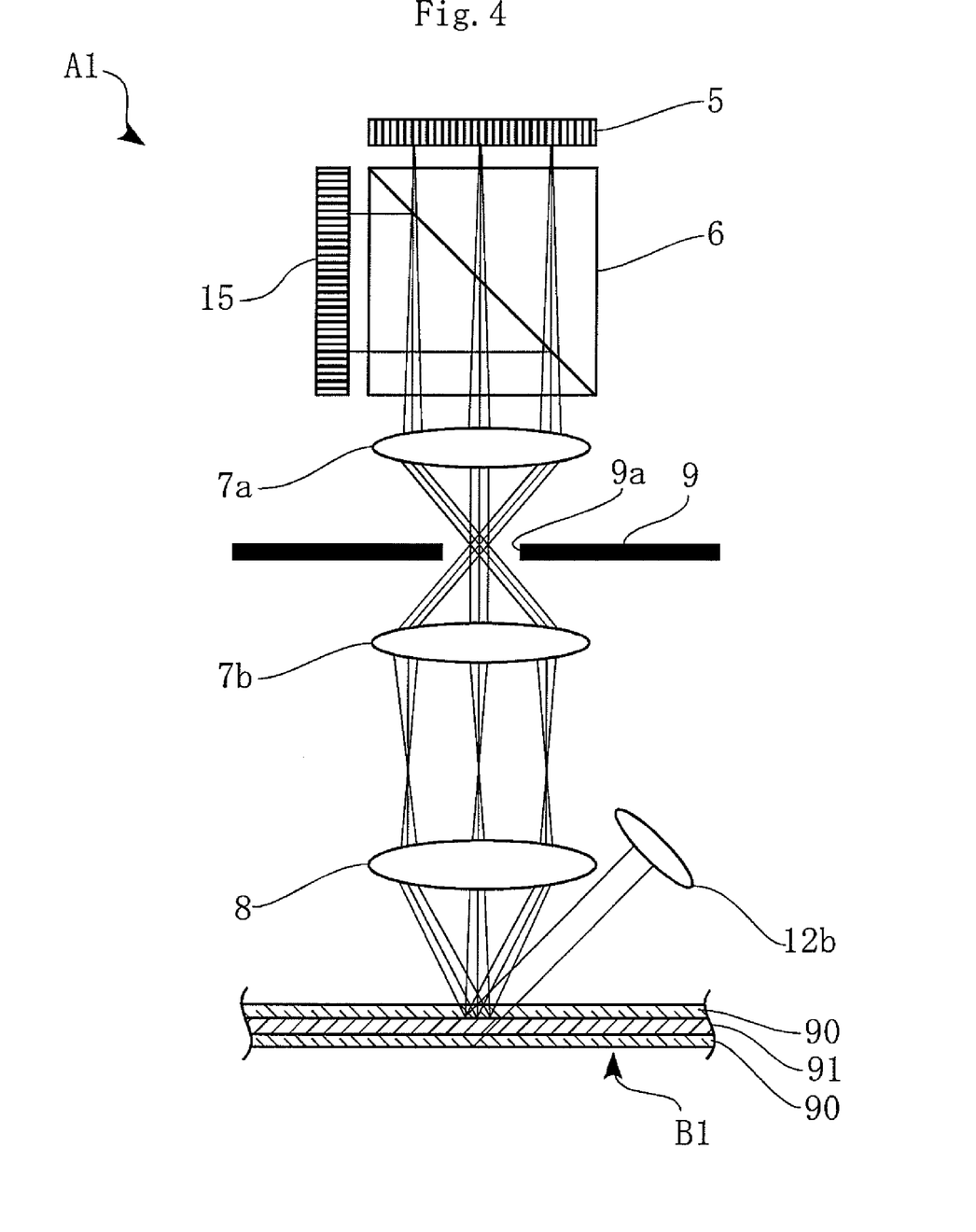
FIG. 4 is an illustrative drawing of multiplex recording by the holographic recorder in FIG. 1.

FIG. 4 shows a case where the distance between the relay lens 7b and the object lens 8 is shorter than a sum of the focal distance of the relay lens 7b and the focal distance of the object lens 8 when making a recording on the storage medium B1. In this case, as shown in FIG. 4, diffracted lights of the laser beam which come out of the object lens 8 are diffused.

The laser beams in FIGS. 2 through 4 have different levels of collimation at the point of focus because of the difference in the distance between the relay lens 7b and the object lens 8. It should be noted here that in FIGS. 2 through 4, the recording is made on the same location of a storage medium B1, with the reference beam from the condenser lens 12b being applied at the same angle with respect to the storage medium B1.

When the reference beam is applied to a storage medium B1 which has undergone the recording processes in FIGS. 2 through 4, three kinds of reproduction beams are generated differing from each other by the degree of collimation corresponding to one of the recordings made in FIG. 2 through 4. Hereinafter, description will be made for a case where the distance between the relay lens 7b and the object lens 8 at the time of reproducing is equal to the sum of the focal distance of the relay lens 7b and the focal distance of the object lens 8.

Figure 5:
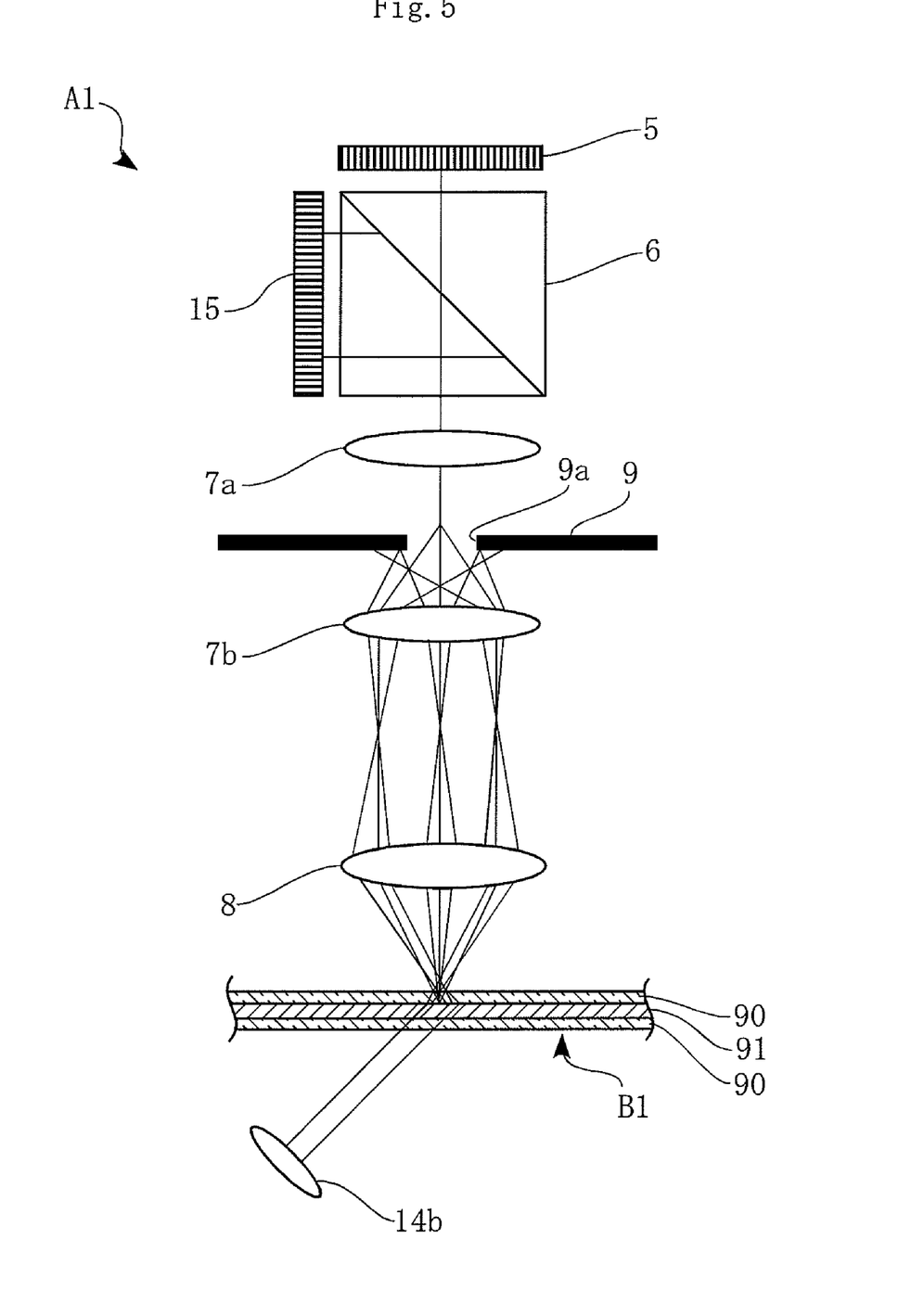
FIG. 5 is an illustrative drawing of record reproducing by the holographic recorder in FIG. 1.
Figure 6:
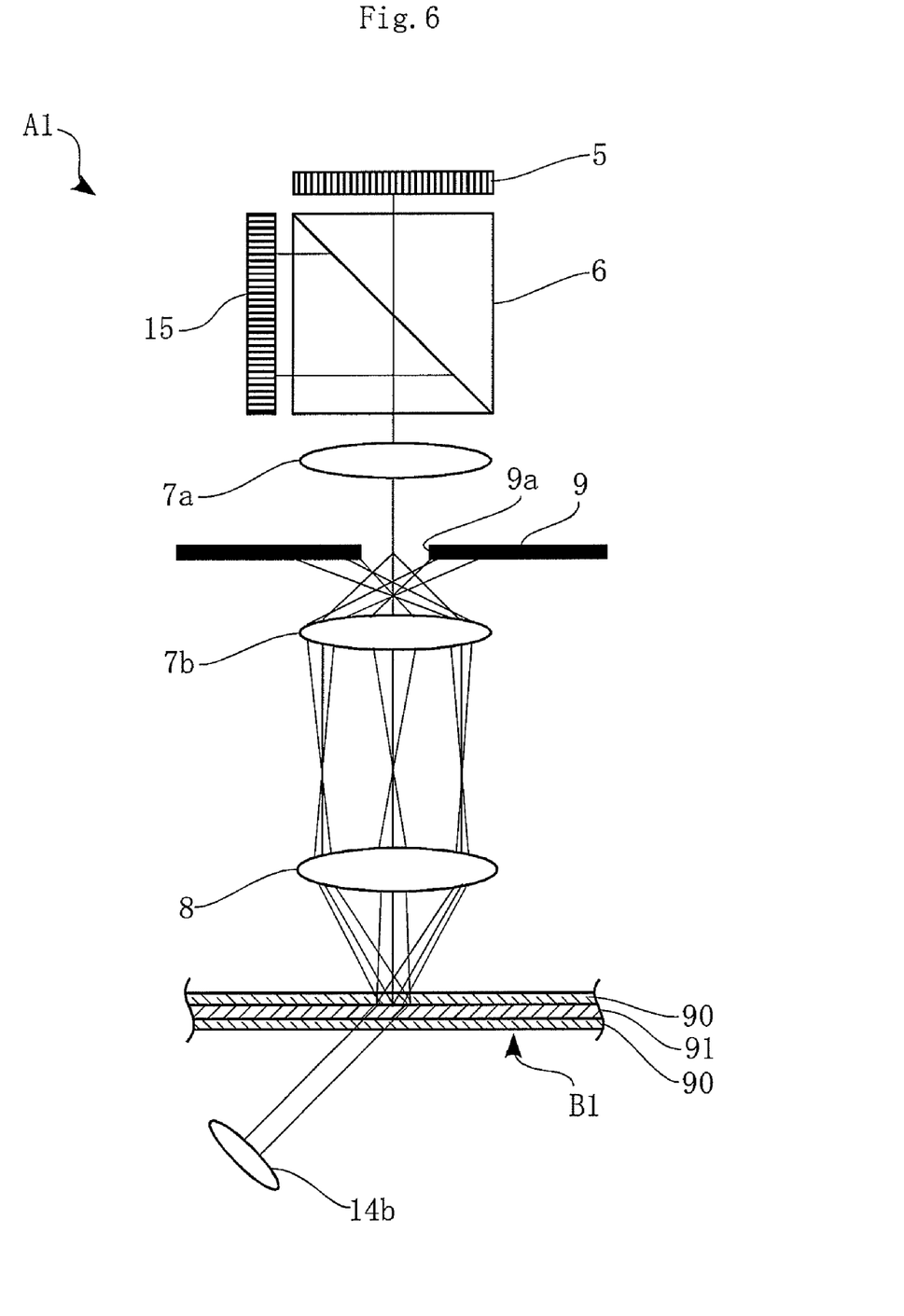
FIG. 6 is an illustrative drawing of record reproducing by the holographic recorder in FIG. 1.

As shown in FIG. 5, the reproduction beam which represents the recording made in FIG. 2 does not focus but diffuses as it passes through the relay lens 7b, and since most part of it is blocked by the beam blocking plate 9, the beam does not reach the relay lens 7a. Meanwhile, the reproduction beam which represents the recording made in FIG. 3 travels on the same path as the information beam in FIG. 3, makes a reflection on the beam splitter 6, and then enters the photo detector 15 whilst as shown in FIG. 6, the reproduction beam which represents the recording made in FIG. 4 diffuses as it passes through the relay lens 7b, and since most part of it is blocked by the beam blocking plate 9, the beam does not reach the relay lens 7a. Specifically, recorded information can be reproduced only when the distance between the relay lens 7b and the object lens 8 as at the time of recording is identical with the distance at the time of reproducing. Because of this, crosstalk is avoided in the defocus-multiplex recording according to the holographic recorder A1.

As described above, according to the holographic recorder A1, it is possible to implement defocus-multiplexing with a relatively simple arrangement, and further, it is possible to increase recording density even more by using angle-multiplex method and shift-multiplex method together. Also, according to the holographic recorder A1, crosstalk is easily avoidable.

Figure 7:
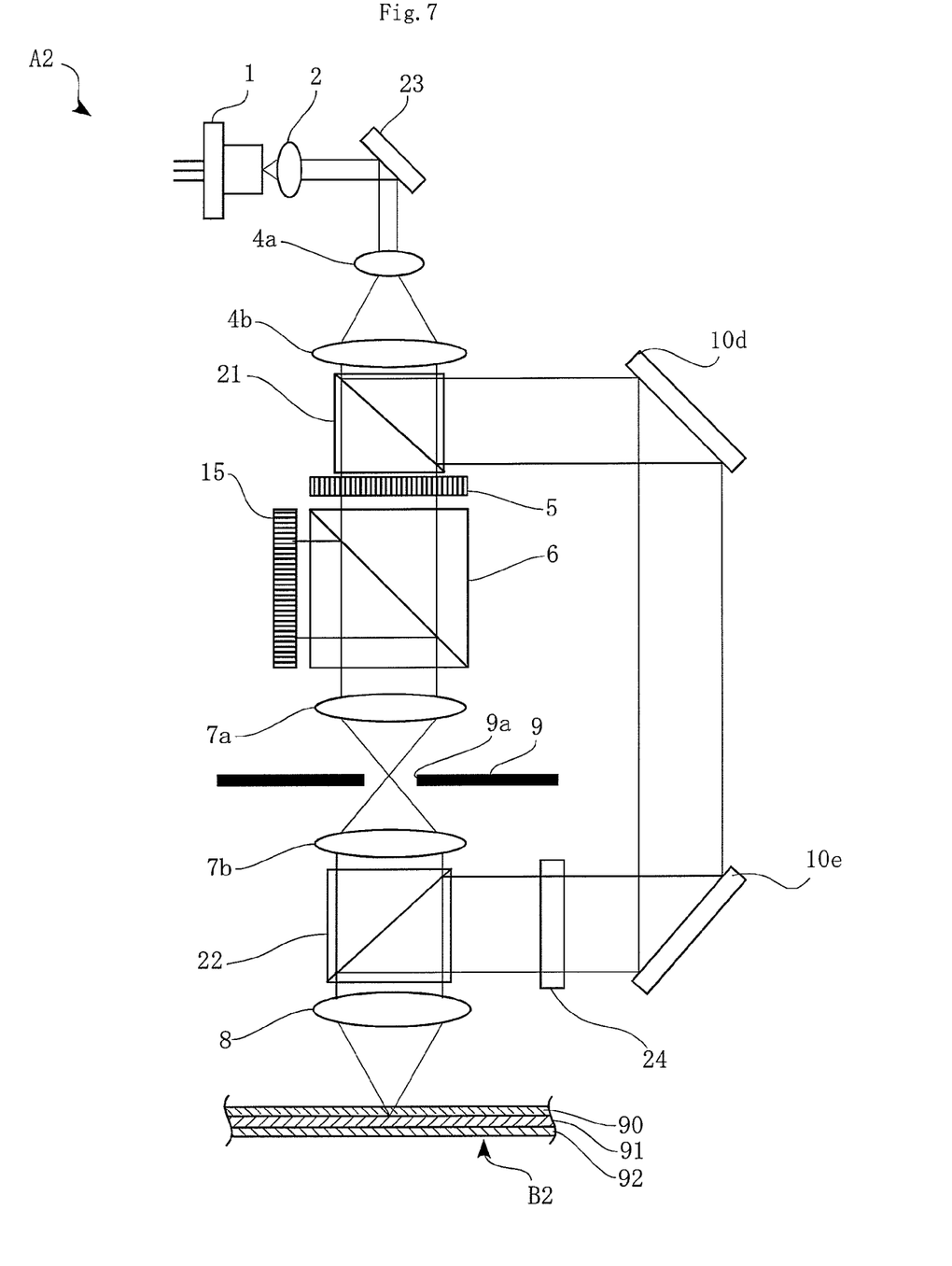
FIG. 7 is a configuration diagram showing a holographic recorder as a second embodiment of the present invention.

FIG. 7 shows a second embodiment of the holographic recorder according to the present invention. A holographic recorder A2 in FIG. 7 performs holographic recording by applying an information beam and a reference beam to a storage medium B2. As shown in FIG. 7, the holographic recorder A2 includes a light source 1, a collimator lens 2, a reflection mirror 23, beam expanders 4a, 4b, a spatial light modulator 5, beam splitters 6, 21, 22, relay lenses 7a, 7b, an object lens 8, a beam blocking plate 9 with an aperture 9a, reflection mirrors 10d, 10e, a diffuser plate 24 and a photo detector 15. It should be noted here that in FIG. 7, constituent elements which are identical with or similar to those in the first embodiment are indicated by the same reference symbols. In the holographic recorder A2, a laser beam from the light source 1 is split into an information beam and a reference beam by the beam splitter 21. The travel path of the information beam is the same as in the holographic recorder A1 while the reference beam is reflected by the reflection mirrors 10d, 10e and then directed by the beam splitter 22 to the object lens 8. In order to make interference with the information beam, the reference beam should preferably have a slightly non-uniform phase and for this reason, the diffuser plate 24 is placed on the reference beam travel path. Note also, that like the holographic recorder A1, the holographic recorder A2 is provided with a mechanism for varying the distance between the relay lens 7b and the object lens 8.

The storage medium B2 differs from the storage medium B1, in that a recording layer 91 provided by a recording material such as a photo polymer is sandwiched by a substrate 90 made of glass for example, and a reflection layer 92. The recording layer 91 is the same as in the storage medium B1. The reflection layer 92 is a metal layer which has a mirror-finish on the surface contacting the recording layer 91.

In the holographic recorder A2, the information beam and the reference beam are applied from the same object lens to the storage medium B2 when recording. Reproducing can be performed by applying a reference beam alone, to a storage medium B2 which already has information records recorded on it. Specifically, when a reference beam is applied to the storage medium B2 from an upper direction as in FIG. 7, a reproduction beam is generated which travels in a downward direction as in FIG. 7. The reproduction beam makes a reflection on the reflection layer 92 back in an upward direction as in FIG. 7, enters the object lens 8, and then passes through the object lens 8 to become a parallel beam. The parallel reproduction beam then passes through the beam splitter 22, and then the relay lenses 7a, 7b sequentially. After leaving the relay lens 7a, the reproduction beam is turned in the leftward direction as in FIG. 7 by the beam splitter 6, into the photo detector 15 and is reproduced.

The holographic recorder A2 has an even simpler structure than the holographic recorder A1 because the reference beam for recording passes through the same object lens as the information beam. Also, the holographic recorder A2 is as capable, as is the holographic recorder A1, of making recording at a high density through utilization of defocus-multiplex and shift-multiplex methods while avoiding crosstalk appropriately.

Figure 8:
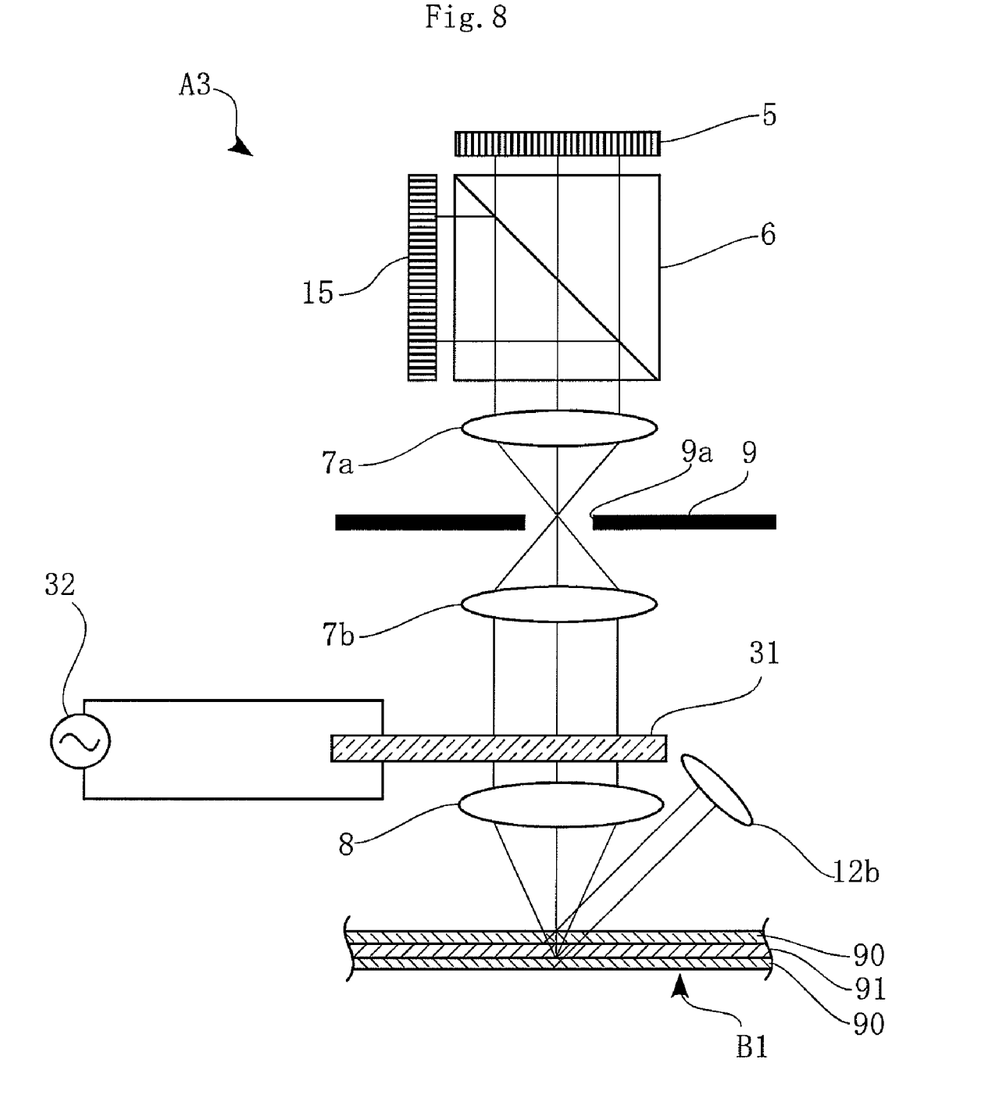
FIG. 8 is a configuration diagram showing a holographic recorder as a third embodiment of the present invention.

FIG. 8 shows a third embodiment of the holographic recorder according to the present invention. A holographic recorder A3 in FIG. 8 is the same as the holographic recorder A1, with an addition, however, of a liquid crystal device 31, which is connected with a power source 32, inserted between the relay lens 7b and the object lens 8. The liquid crystal device 31 is like a flat plate, and is laid in a left-right direction as in FIG. 8, on the travel path of the information beam. Further, the liquid crystal device 31 varies its refraction index according to a voltage applied to it. It should be noted here that since the holographic recorder A3 has substantially the same as the holographic recorder A1, FIG. 8 only shows the liquid crystal device 31 and the surrounding components.

When the voltage applied to the liquid crystal device 31 is varied in the holographic recorder A3, the refraction index of the liquid crystal device 31 varies. When the refraction index of the liquid crystal device 31 increases, an optical distance increases within the liquid crystal device 31 between the relay lens 7b and the object lens 8. On the other hand, when the refraction index of the liquid crystal device 31 decreases, the optical distance decreases within the liquid crystal device 31 between the relay lens 7b and the object lens 8. Specifically, varying the refraction index of the liquid crystal device 31 provides the same effect as varying the distance between the relay lens 7b and the object lens 8. Thus, the holographic recorder A3 is able to perform the same defocus-multiplexing as in the holographic recorder A, without varying the physical distance between the relay lens 7b and the object lens 8.

Figure 9:
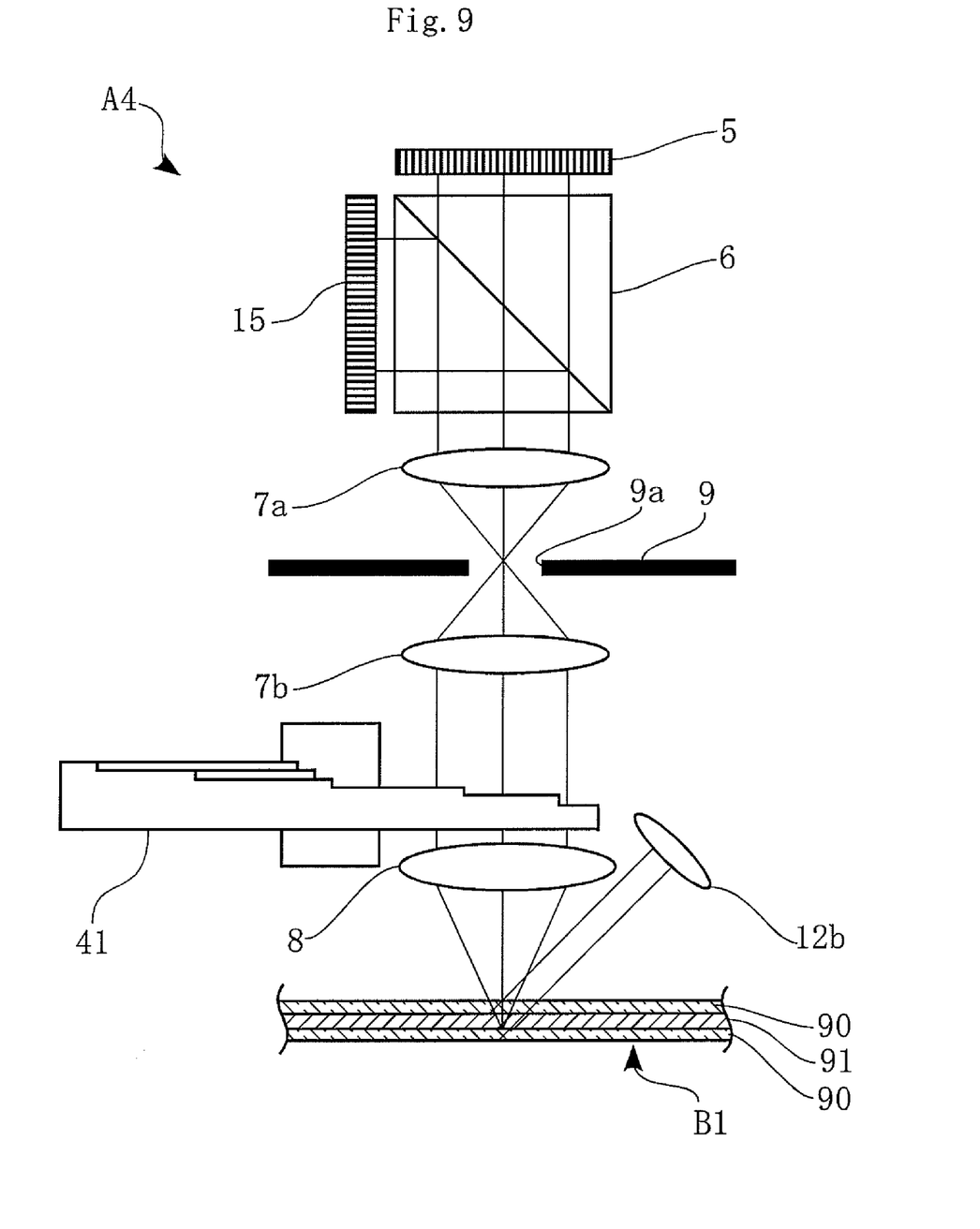
FIG. 9 is a configuration diagram showing a holographic recorder as a fourth embodiment of the present invention.
Figure 10:
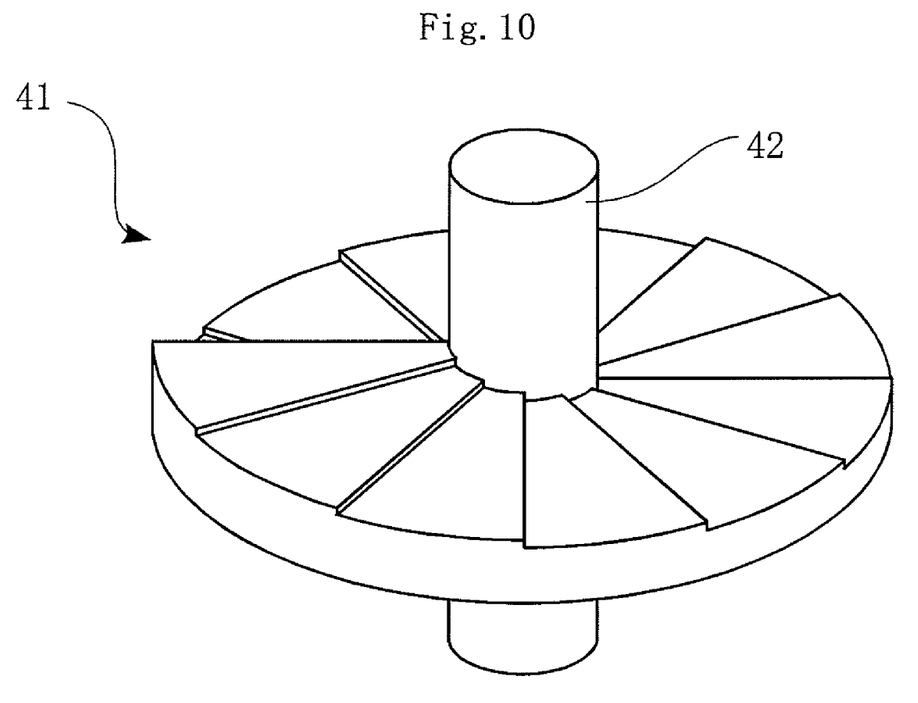
FIG. 10 is an enlarged view of a rotating flat-plate device in FIG. 9.

FIG. 9 shows a fourth embodiment of the holographic recorder according to the present invention. A holographic recorder A4 in FIG. 9 is the same as the holographic recorder A1, with an addition, however, of a rotating flat-plate device 41 inserted between the relay lens 7b and the object lens 8. FIG. 10 shows a perspective view of the rotating flat-plate device 41. It should be noted here that since the holographic recorder A4 has substantially the same as the holographic recorder A1, FIG. 9 only shows the rotating flat-plate device 41 and the surrounding components.

As shown in FIG. 10, the rotating flat-plate device 41 is a substantially disc-like, transparent member including a center shaft 42 and surrounding segments each having a different thickness from the others. The rotating flat-plate device 41 is rotated to assume a desired rotating position, so that a selected one of the segments is placed on the path of the information beam. Specifically, when the rotating flat-plate device 41 is rotated in the holographic recorder A4, the optical distance between the relay lens 7b and the object lens 8 is changed. Thus, the holographic recorder A4 is able to perform the same defocus-multiplexing as in the holographic recorder A, without varying the physical distance between the relay lens 7b and the object lens 8.

The scope of the present invention is not limited to the embodiments described above, but any variations within the range of description made in each claim are included in the scope of the present invention. For example, the holographic recorders A3, A4 are the holographic recorder A1 which further includes a liquid crystal device 31 or a rotating flat-plate device 41, but these additions may be made to the holographic recorder A2. Specifically, a liquid crystal device 31 or a rotating flat-plate device 41 may be disposed between the relay lens 7b and the beam splitter 22 in the holographic recorder A2.

The invention claimed is:

1. A holographic recorder comprising: a light source for outputting coherent light; a beam splitter for splitting the light coming from the light source into at least two beams; a spatial light modulator for modulating one of the beams split by the beam splitter into an information beam containing two-dimensional information; relay lenses for relaying the information beam; and an object lens for allowing the information beam relayed by the relay lenses to travel toward a storage medium; the relay lenses including a first relay lens closer to the spatial light modulator and a second relay lens spaced from the first relay lens by a distance and closer to the object lens, the other of the beams split by the beam splitter being used as a reference beam for interference with the information beam in the storage medium, wherein an optical distance between the second relay lens and the object lens is variable, wherein the recorder further comprises an optical device having a predetermined thickness and a variable refraction index, disposed between the second relay lens and the object lens.

2. The holographic recorder according to claim 1, wherein the optical device is provided by a liquid crystal device which changes its refraction index in accordance with a voltage applied.

3. A holographic recorder according to comprising: a light source for outputting coherent light; a beam splitter for splitting the light coming from the light source into at least two beams; a spatial light modulator for modulating one of the beams split by the beam splitter into an information beam containing two-dimensional information; relay lenses for relaying the information beam; and an object lens for allowing the information beam relayed by the relay lenses to travel toward a storage medium; the relay lenses including a first relay lens closer to the spatial light modulator and a second relay lens spaced from the first relay lens by a distance and closer to the object lens, the other of the beams split by the beam splitter being used as a reference beam for interference with the information beam in the storage medium, wherein an optical distance between the second relay lens and the object lens is variable, wherein the recorder further comprises a transparent member disposed along a path of the information beam between the second relay lens and the object lens, the transparent member including sections of different thicknesses movable to come across the information beam path.

4. The holographic recorder according to claim 3, wherein the transparent member is a generally disc-shaped or doughnut-shaped plate including a number of circumferentially arranged segments each having a different thickness from the others, the transparent member being rotated to place a selected one of the segments on the information beam path.

* * * * *